(12) United States Patent
Lynch et al.

(10) Patent No.: US 7,889,399 B1
(45) Date of Patent: Feb. 15, 2011

(54) DOT ENABLED TEMPLATE

(75) Inventors: Larry Lynch, Los Gatos, CA (US);
Sandor Kiss, Petaluma, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 1089 days.

(21) Appl. No.: 11/644,738

(22) Filed: Dec. 22, 2006

(51) Int. Cl.
*H04N 1/04* (2006.01)
*G09G 5/00* (2006.01)

(52) U.S. Cl. ........................................ 358/488; 345/619
(58) Field of Classification Search ................ 345/764, 345/835, 157, 672, 163, 156, 339, 100, 429, 345/619; 463/30, 43, 29; 358/453, 462, 358/488
See application file for complete search history.

(56) References Cited

U.S. PATENT DOCUMENTS

| | | | | |
|---|---|---|---|---|
| 5,909,207 A * | 6/1999 | Ho | | 345/156 |
| 6,229,502 B1 * | 5/2001 | Schwab | | 345/1.1 |
| 7,136,061 B2 * | 11/2006 | Cordner | | 345/419 |
| 7,555,724 B2 * | 6/2009 | Ho | | 715/776 |
| 2001/0035880 A1 * | 11/2001 | Musatov et al. | | 345/764 |
| 2007/0155464 A1 * | 7/2007 | Baerlocher et al. | | 463/16 |
| 2008/0284733 A1 * | 11/2008 | Hill et al. | | 345/163 |
| 2009/0055205 A1 * | 2/2009 | Nguyen et al. | | 705/1 |
| 2010/0053206 A1 * | 3/2010 | Ohnishi | | 345/619 |
| 2010/0079373 A1 * | 4/2010 | Ohnishi | | 345/157 |
| 2010/0173705 A1 * | 7/2010 | Manning et al. | | 463/30 |

* cited by examiner

*Primary Examiner*—Jerome Grant, III (57) ABSTRACT

A dot template for enabling user interaction between a computing device and a printed material. The template comprises a plurality of dot patterns for position determination. The template further comprises a plurality of icons for accepting input/output (e.g., a handwriting recognition pad, a keyboard) and for controlling the operation of a computing device (e.g., volume control, controlling audio/video information). The transparent template is placed over a printed material. Information regarding the printed material (e.g., Time magazine, October publication, page 11) is entered on the template using the computing device. The printed material is identified and its corresponding program is accessed. In response to a selection of a printed element the computing device detects the corresponding dot patterns, uses the program to determine the selected printed element and outputs related information to the selected printed element.

19 Claims, 10 Drawing Sheets

DOT ENABLED TEMPLATE

BACKGROUND ART

In general, computing devices have been used to provide user interaction with printed material (e.g., a book, a photograph, etc.). User interaction using a computing device has become popular as a learning tool. For example, a child may use a computing device in order to select an object in a book and in response to the selection a representation of the object is read out by the computing device. A computing device may be equipped with additional features. For example, the computing device may further provide spelling for the selected object and use the selected object in a sentence.

Interaction between a computing device and printed material (e.g., a book) may be implemented through encoding the printed material with a plurality of codes. The code may be a plurality of unique dot patterns. In general, dot patterns are used in order to determine the relative location of a printed or written element on the printed material such that the element can be identified. Registration of the element is accomplished via the elements relative to the unique dot pattern.

Facilitating user interaction described above requires the printed material (e.g., a book) to be encoded with dot patterns. Therefore, by detecting the dot patterns, printed elements on a printed material can be detected and determined by using a computing device. Encoding printed material is a costly process because complex printing technology is required for the printed material and dot patterns to exist together.

Moreover, costly printing technology does not solve the problem for printed materials that are already in circulation but lack dot patterns for detection by a computing device. Therefore, for these publications there is no way for a pen based computing device to detect printed elements.

Also, the dot pattern used to provide position is unique and limited in area. Large numbers of publications, e.g., periodic publications, can threaten to utilize the pattern space to exhaustion. Conservation of the dot area would be useful.

SUMMARY

Accordingly, a need has arisen to provide a dot template or overlay to eliminate the need to encode printed material with dot patterns. Moreover, a need has arisen to provide a dot template to enable user interaction with printed materials that do not have encoded dot patterns. Furthermore, a need has arisen to provide a dot template such that the dot template is not unique to particular printed material and therefore the pattern can be re-used and therefore conserved. It will become apparent to those skilled in the art after reading the detailed description of the present invention that the embodiments of the present invention satisfy the above mentioned needs.

In one embodiment of the present invention, a dot bearing template comprises two portions. The first portion comprises a plurality of dot patterns used for detecting a printed element. In one embodiment, the plurality of dot patterns may use Anoto dot patterns, Sunplus dot patterns or Takara dot patterns, to name a few. The second portion of the dot template may comprise a plurality of icons operating to accept input/output and for controlling the operation of a computing device. The dot template is operable to be placed over a printed material (e.g., a book or magazine). A printed material may be a page in a book, a publication, a periodical, an art book, food packaging, maps, atlases or LCD display, to name a few. The material used to create the dot template is transparent and may be polyvinyl chloride, polyethylene terephthalate, mylar, acetate or any combination thereof.

In one embodiment, the dot template is placed on a printed material and aligned using at least one registration mechanism. In one embodiment, the dot template may be heated during manufacturing to generate a bump on the template surface such that the template may slide into place when placed on a printed material and that further servers as a registration mark. The registration mark may include fiducial and other targets that may be used for alignment. The dot template may be protected against scratching and other damage (e.g., wear and tear) using a protection layer covering the dot patterns. In one embodiment, the protection layer may be a clear coating laminate. Furthermore, a frame may be used to house the dot template in order to protect it against scratching and other damages. The frame may be used as a registration tool for aligning the dot template with the printed material.

In one embodiment, the second portion of the dot template may comprise a plurality of icons for entering information e.g., an alphanumeric keyboard. The second portion may further comprise a plurality of icons for controlling the operation of the computing device (e.g., volume control, mute, pause, etc.).

In one embodiment, the computing device may be a pen shaped like device. The computing device may be used to enter information regarding the printed material. For example, the user may enter the name of the magazine and the page number using a keyboard printed on the dot template or by using the handwriting recognition pad of the dot template. Accordingly, the computing device can determine and identify the printed material (e.g., a Time magazine, October 2006 publication, page 11). Upon determining the printed material identification, the computing device may use a stored program in the computing device related to this publication or alternatively access the program stored on a server or download the program. The program may provide various types of information and/or content about the printed material (e.g., coordinates of various printed elements and education information related to the printed element). It is appreciated, that in one embodiment the dot template may be unique for a particular publication, thereby eliminating the need to enter and determine the printed material and/or the page.

The template is overlaid onto the printed content and aligned thereto. In response to a user selection of a printed element (e.g., a picture of George Washington on page 11 of October 2006 issue of Time magazine), the computing device is positioned on top of the template and it detects the dot patterns on the template that correspond to the selected printed element (e.g., picture of George Washington). In response to the detection of the dot pattern and using the program related to this publication, the computing device determines the printed element corresponding to the detected dot patterns (e.g., the picture of George Washington). Upon determining the printed element, the computing device may determine the information in the program that is associated with the printed element (e.g., biography of George Washington). In response to determining the information, the computing device may output the information to the user (e.g., audio/video output).

Accordingly, a dot template is created, which eliminates the need to encode the printed material with dot patterns yet allows pen based interaction with the printed material. The dot template enables user interaction with printed materials without encoding the printed materials with dot patterns. Furthermore, the dot template that is created may not be unique to a particular printed material and as a result can be re-used with potentially any printed material to thereby conserve the total dot area.

More specifically, an embodiment of the present invention pertains to a system including a dot template that includes a first portion comprising a plurality of dot patterns, wherein the first portion is a substantially transparent layer and operable to be placed over a printed material comprising a plurality of printed elements; and a second portion comprising a plurality of selectable items operable to enable a user to control the interaction between a computing device and the printed material; and a computing device operable to enable selection of a printed element, and in response thereto to identify the selected printed element and provide information about the selected printed element based on said plurality of dot patterns corresponding to the selected printed element. In one embodiment, polyvinyl chloride, polyethylene terephthalate, mylar or acetate may be used to create the dot template transparent layer.

Embodiments include the above and wherein the dot template further comprises at least one registration mark operable to align the dot template with the printed material. In one embodiment, the first portion further comprises a protection layer operable to protect the plurality of dot patterns from damage, and wherein the protection layer covers the exposed surface of the plurality of dot patterns. The protection layer may be a clear coating or a laminate.

In one embodiment, the dot template may further include a frame for housing the dot template wherein the frame is operable to protect the dot template from being damaged, and wherein the frame is further operable to align the dot template with the printed material.

In one embodiment, the second portion includes at least one of a plurality of icons printed on the template operable for entering information (such as an alphanumeric keyboard), a plurality of icons for controlling volume of the computing device, a plurality of icons for controlling audio/video information, and a power icon for activating and deactivating interaction between the computing device and the dot template, or any combination thereof. In one embodiment, the computing device in response to a user entering information about the printed material identifies the printed material such that in response to a selection of a printed element, information about the selected printed element can be provided to the user.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on or from computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "calculating" or "measuring" or "querying" or "identifying" or "outputting" or "downloading" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Dot Enabled Template

Figure 1A:
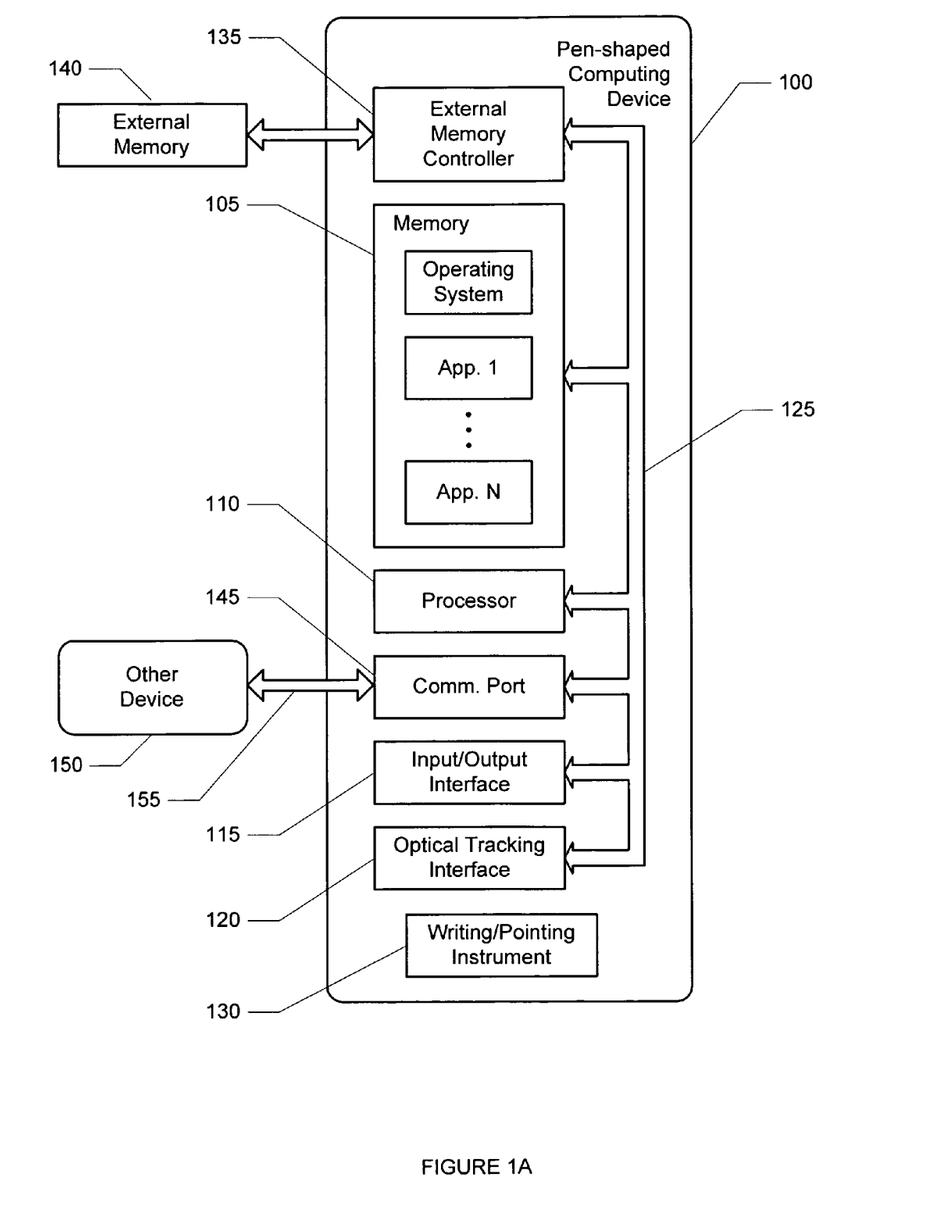
FIG. 1A shows an exemplary block diagram of a computing device upon in accordance with one embodiment of the present invention.

Referring now to FIG. 1A, an exemplary block diagram of a computing device 100 in accordance with one embodiment of the present invention is shown. In general, the computing device 100 may have a form factor similar to a pen, stylus or the like. The computing device 100 includes system memory 105, a processor 110, an input/output interface 115, an optical tracking interface 120, one or more buses 125, and a writing/pointing instrument 130. The system memory 105, processor 110, input/output interface 115 and optical tracking interface 120 are communicatively coupled to each other by the one or more buses 125.

The memory 105 may include one or more well known computer-readable media, such as static or dynamic read only memory (ROM), random access memory (RAM), flash memory, magnetic disk, optical disk and/or the like. The memory 105 may be used to store one or more sets of instructions and data that, when executed by the processor 110, cause the computing device 100 to perform the functions described herein. One or more of the functions enable content to be segmented and used by different applications. One or more of the functions may also allow for multiple interactive layers to the same content. Furthermore, one or more of the functions may also enable new applications to be downloaded to the computing device without having to upgrade the operating system and/or one or more applications.

The computing device 100 may further include an external memory controller 135 for removably coupling an external memory 140 to the one or more busses 125. The computing device 100 may also include one or more communication ports 145 communicatively coupled to the one or more busses 125. The one or more communication ports can be used to communicatively couple the computing device 100 to one or more other devices 150. The computing device 110 may be communicatively coupled to other devices 150 by a wired communication link and/or a wireless communication link 155. Furthermore, the communication link may be a point-to-point connection and/or a network connection.

The input/output interface 115 may include one or more electro-mechanical switches operable to receive commands and/or data from a user. The input/output interface 115 may also include one or more audio devices, such as a speaker, a microphone, and/or one or more audio jacks for removably coupling an earphone, headphone, external speaker and/or external microphone. The audio device is operable to output audio content and information and/or receiving audio content, information and/or instructions from a user. The input/output interface 115 may optionally include video devices, such as an LCD (liquid crystal) display for displaying alphanumeric and/or graphical information and/or a touch screen display for displaying and/or receiving alphanumeric and/or graphical information.

The optical tracking interface 120 may include a light source or optical emitter and a light sensor or optical detector. The optical emitter may be a light emitting diode (LED) and the optical detector may be a charge coupled device (CCD) or complementary metal-oxide semiconductor (CMOS) imager array, for example. The optical emitter illuminates a surface of a media or a portion thereof and light reflected from the surface is received at the optical detector.

Figure 1B:
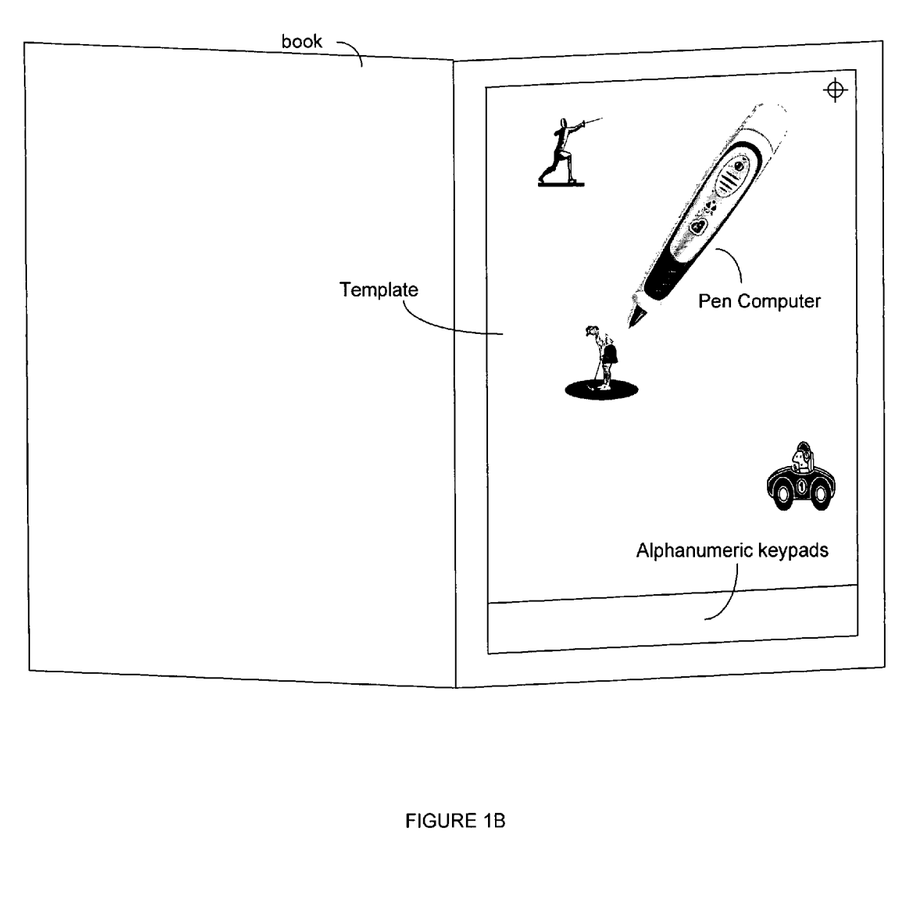
FIG. 1B shows an exemplary interaction of a computing device with a printed material using a template in accordance with one embodiment of the present invention.

Referring now to FIG. 1B, an exemplary interaction of a computing device with a printed material using a template in accordance with one embodiment of the present invention is shown. In one embodiment, the printed material may be a book. The transparent template in accordance with one embodiment of the present invention is overlaid a page in the book. In this example, the page in the book may comprise a plurality of selectable printed elements (e.g., a picture of a race car driver, a picture of a golfer, a picture of fencing). The user may enter information about the book in order to identify the book using alphanumeric keypads at the bottom of the template. Moreover, the user may identify the page number using the alphanumeric keypads. In one embodiment, the pen computer device may be used to select a printed element (e.g., a picture of a golfer) from a page in the book. Based on the selection by the pen computer device using the template, the pen computer device may output information about the selected printed element.

Figure 2:
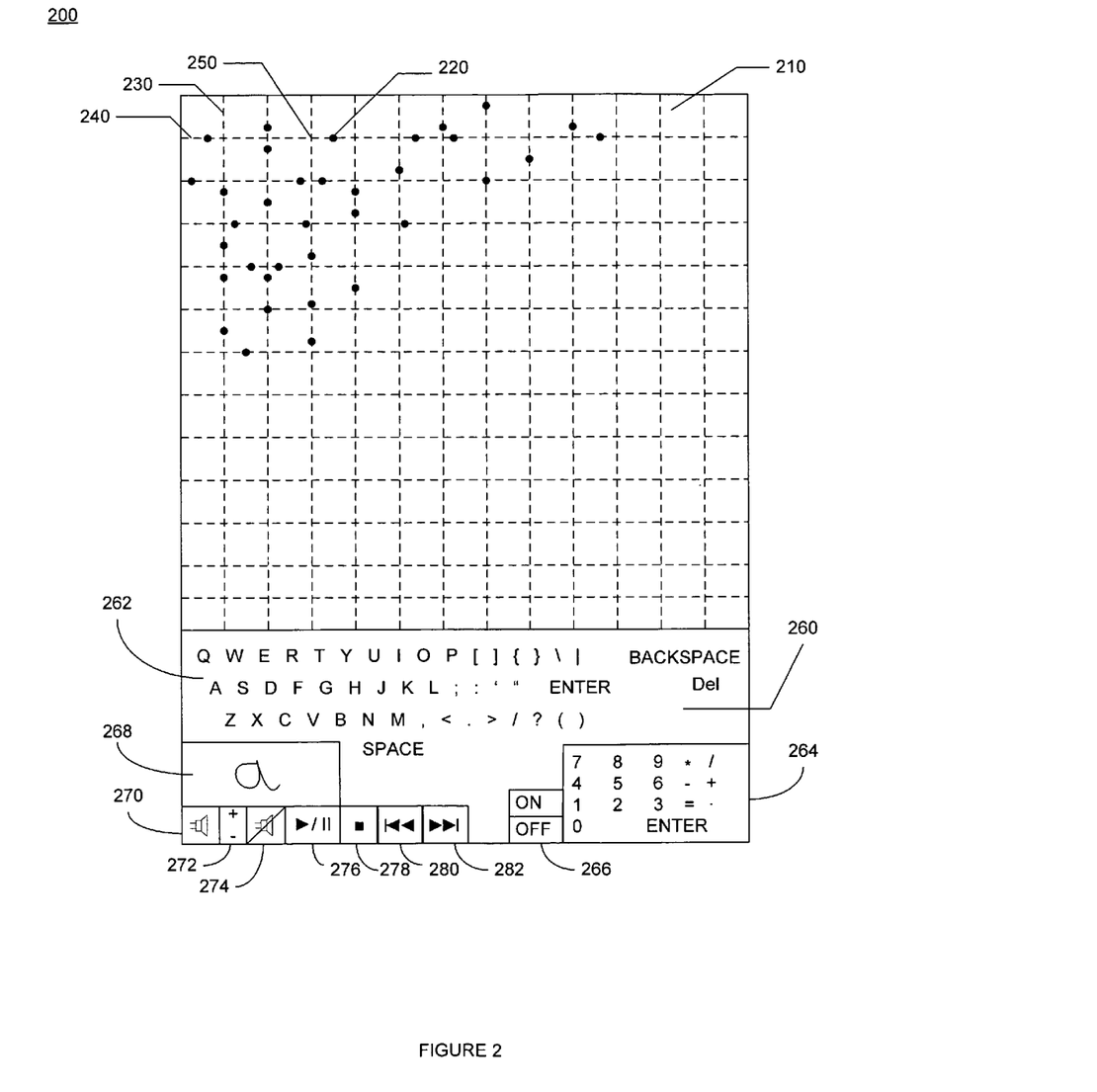
FIG. 2 shows a dot enabled template in accordance with one embodiment of the present invention.

Referring now to FIG. 2, a dot template in accordance with one embodiment of the present invention is shown. The dot template is operable to be placed over any printed material such as, a page of a book, a publication, a periodical, an art book, maps, food packaging, atlases, or overlay LCD display, to name a few. The dot template 200 is page like and may be made from material such as polyvinyl chloride, polyethylene terephthalate, mylar, acetate or any combination thereof, to name a few. The dot template 200 may be made from clear material or layer such that when placed over a printed material, printed elements on the printed material may be seen there through by a user. In general, the size of the template is made to correspond to the printed material with which the template is expected to operate.

In one embodiment, the dot template 200 comprises two portions. The first portion 210 or area comprises a plurality of dot patterns 220 detectable by the optical detector. Accordingly, the first portion 210 provides a coding pattern, upon which embodiments of the present invention can be implemented. The second portion 260 or area may comprise a plurality of selectable items operable to enable a user to control the interaction between the computing device 100 and a printed material.

In one embodiment, the first portion 210 has printed thereon a coding pattern in the form of optically readable position code that consists of a plurality of dot patterns 220. The dots 220 may not be easily discernible by the human visual system, and may appear as grayscale. In one embodiment, the plurality of dot patterns 220 is substantially invisible and printed on the dot template. The dots 220, for example, may have a nominal spacing of 0.3 millimeters and may be part of an overall dot pattern, with 669,845,157,114, 773,458,169 dots encompassing an area in excess of 4.6 million square kilometers, which corresponds to about 73 trillion letter-size pages. The dot patterns may be in accordance to Anoto dot patterns, Sunplus dot patterns or Takara dot patterns, to name a few. The following patents and patent applications are assigned to Anoto and describe the basic technology and are all herein incorporated by reference in their entirety for all purposes: U.S. Pat. No. 6,502,756, U.S. application Ser. No. 10/179,966, filed on Jun. 26, 2002, WO 01/95559, WO 01/71473, WO 01/75723, WO 01/26032, WO 01/75780, WO 01/01670, WO 01/75773, WO 01/71475, WO 00/73983, and WO 01/16691.

As the writing/pointing instrument 130 and the optical tracking interface 120 move together relative to the surface of the dot template 200 placed over a printed material, successive images of the printed dots are captured. The optical detector, for example, may take snapshots of the surface 100 times a second or more. By analyzing the images, position on the surface of the dot template and movement relative to the printed material can be tracked and printed elements can be determined when the template is overlaid on top of the printed material.

In one embodiment, the optical detector fits the dots to a reference system in the form of a raster with raster lines 230, 240 that intersect at raster points 250. Each of the dots 220 is associated with a raster point. For example, the dot 220 is associated with raster point 250. For the dots 220 in an image, the displacement of a dot 220 from the raster point 250 associated with the dot 220 is determined. Using these displacements, the pattern in the image is compared to patterns in the reference system. Each pattern in the reference system is associated with a particular location on the surface of the dot template. Thus, by matching the pattern in the image with a pattern in the reference system, the position of the writing/pointing instrument 130 relative to the surface of the template can be determined, thereby determining the printed element corresponding to that particular location. This refers to a printed element on the template, such as in region 260 as described below, or a printed element on printed media overlaying the template.

By interpreting the positions of the dots 220 captured in each snapshot, the operating system and/or one or more applications executing on the computing device 100 can precisely determine the position (e.g., position in a unique region) of the computing device 100 in two dimensions. That is, in a Cartesian coordinate system, for example, an x-coordinate and a y-coordinate corresponding to the position of the writing/pointing instrument 130 relative to the dot template (e.g., surface) can be determined. As the writing/pointing instrument and the optical detector move together relative to the dot template, the direction and distance of each movement can be determined from successive position data.

In addition, different parts of the pattern can be assigned different functions, and software programs and applications may assign functionality to the various patterns of dots within a respective region. Furthermore, by placing the optical detector in a particular position on the dot template and performing an actuating event, a specific instruction, command, data or the like associated with the position can be entered and/or executed. For example, the writing/pointing instrument 130 may be mechanically coupled to an electro-mechanical switch of the input/output interface 115. Therefore, double tapping substantially the same position can cause a command assigned to the particular position to be executed.

Referring still to FIG. 2, the second portion of the dot template may be used to control the interaction between the computing device 100 and a printed material. In one embodiment, the writing element 130 can be, for example, a pen, pencil, marker or the like, and may or may not be retractable. In one or more instances, a user can use writing/pointing instrument 130 to make strokes on the dot template (e.g., handwriting recognition portion 268 which may comprise a plurality of dot patterns), including letters, numbers, symbols, figures and the like. These user-produced strokes can be captured (e.g., imaged and/or tracked) and interpreted by the computing device 100 according to their position on the surface on the encoded media. The position of the strokes can be determined using the pattern of dots on the surface. In one embodiment, the strokes in portion 268 can also be interpreted by the computing device 100 using optical character recognition (OCR), handwriting recognition and/or handwriting understanding techniques that recognize handwritten characters (or 'written signals').

The second portion 260 may comprise a keyboard portion 262 and numeric portion 264 printed on the template, to enable a user to enter information by tapping on the representative symbols. For example, the keyboard portion 262 and the numeric portion 264 may be used to enter information regarding the printed material. For instance, the dot template may be placed over a printed material (e.g., Time magazine, October publication, page 11). The user can enter the information regarding the printed material (e.g., Time magazine, October 2006 publication, page 11) by tapping on symbols representing the name of the publication. The entered information may be used by the computing device 100, as described above, to determine and identify the printed material (e.g., Time magazine, October 2006 publication, page 11). Accordingly, the program associated with this publication and its content including a plurality of printed elements and their locations relative to the dot pattern on the template is accessed. It is appreciated that the handwriting recognition portion 268 may also be used for entering this information.

In one embodiment, the accessed program may comprise a reference system such that the captured pattern by the computing device 100 can be compared as described above, thereby enabling detection and identification of a printed element selected by the pen computer. For example, the accessed program may comprise reference information with regards to the location of a plurality of printed elements (e.g., picture of George Washington) using the pen computer on the printed material. Accordingly, when a user selects a printed element (e.g., picture of George Washington) the accessed program is used to identify and determine the printed element by comparing the coordinates of the pen to the known coordinates of the selected printed element, as described above. In this example, the picture of George Washington is identified based on the contents programming for the identified page and based on the current location of the pen computer. In one embodiment, the accessed program may comprise additional information about the selected printed element (e.g., biography of George Washington).

In one embodiment, the computing device 100 as described above, may output the additional information corresponding to the identified and determined printed element (e.g., biography of George Washington). The output could be an audio rendering or visual rendering or both. It is appreciated that in one embodiment, the accessed program may be previously stored in the computing device 100. Alternatively, in one embodiment, the accessed program may be downloaded to the computing device 100. The accessed program may be downloaded in response to determining and identifying the printed material. It is further appreciated that in one embodiment, the program may be accessed without downloading the program.

It is appreciated, that in one embodiment the dot template may be unique for a particular publication (e.g., Time magazine, October 2006 publication), thereby eliminating the need to identify the printed material. In an embodiment where the dot template is unique for a given printed material, an ON/OFF icon 266 may be used to activate and deactivate the interaction between the dot template 200 and the computing device 100. In this example, the user may only need to identify the page number using the numeric keyboard. Accordingly, when the ON/OFF icon 266 is activated, the user may simply start using the dot template 200 by selecting various printed elements of the underlying printed material.

It is appreciated that in one embodiment, the second portion 260 may optionally comprise additional functional icons in order to control the interaction between the computing device 100 and the dot template 200. For example, the second portion 260 may comprise a volume icon 270, icon 272 for increasing/decreasing the volume, a mute icon 274, a play/pause icon 276, a stop icon 278, a skip backward icon 280 and a skip forward icon 282. Accordingly, a user may adjust the volume of the computing device 100 by tapping on the volume adjust icons of the template. Additionally, a user may adjust, play, pause, stop, skip forward and skip backward when the computing device 100 is outputting information. It is appreciated that icon identification in region 260 is enabled via dot patterns printed therein, similar to the first region 210.

It is appreciated that the dot template 200 may have additional icons that are content-specific depending on the application. For example, if the dot template is for a cook book, one of the icons in the second portion 260 may be a measurement icon (not shown) such that when selected the computing device 100 outputs the amount of cooking ingredient to be used for a selected recipe.

Accordingly, a dot template is placed over a printed material and the printed material is identified, either through a user entry or through using a unique dot template specific for the printed material. A printed element may be selected by a user selecting a portion of the dot template that corresponds to the printed element. In response to the selection, a plurality of dot patterns corresponding to the selected portion is determined. As a result, the coordinates of the plurality of dot patterns corresponding to the selected portion is compared to the reference system. Through this comparison and the programming for this printed material the printed element may be determined and identified. In response to this determination and identification of the printed element, the computing device may output information regarding the printed element by accessing a corresponding program for the identified printed material.

It is therefore appreciated that a dot template enables interaction with printed materials that do not themselves have dot patterns printed thereon. As such, using the dot template as described above eliminates the need to encode printed materials with dot patterns while still providing pen based user interaction. Furthermore, it is appreciated that through using a dot template, potentially any printed material may be used interactively with the computer system. Additionally, it is appreciated that the cost of enabling interactivity is reduced since a dot template can be used instead of encoding every page of a printed material with a dot pattern.

Figure 3:
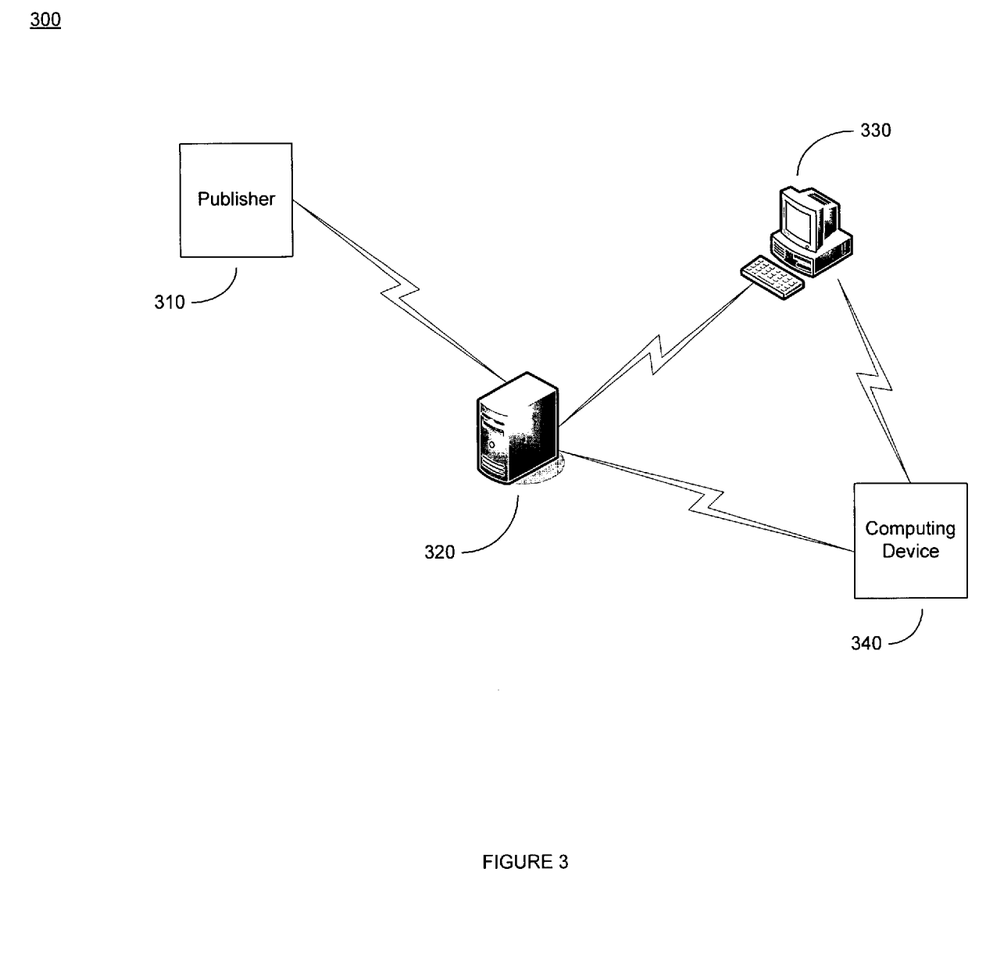
FIG. 3 shows an exemplary system connection for connecting a computing device in accordance with one embodiment of the present invention.

Referring now to FIG. 3, an exemplary network system 300 for connecting a computing device in accordance with one embodiment of the present invention is shown. In one embodiment, the publisher 310 of a printed material may provide the printed material to a server 320. The server 320 may receive and convert the printed material to an appropriate program format such that the content of the printed material correspond to a plurality of dot patterns on the dot template described above.

In one embodiment, in addition to the plurality of dot patterns for printed elements, additional information may be added. For example, if a printed material is a Time magazine, October 2006 edition, in addition to converting the content of the publication into a plurality of coordinates for the plurality of dot patterns, recognizable by a computing device as described above, additional information may be added to printed elements such as media content. For instance, on page 11 of the magazine containing a printed element (e.g., picture of George Washington), additional information (e.g., biography data of George Washington) may be added to the plurality of coordinates. Accordingly, when a user selects a printed element corresponding to a plurality of dot patterns on the dot template, the printed element is recognized by a computing device which may output additional information such as the biography of George Washington.

In one embodiment, the program containing a plurality of coordinates and additional information for the printed material may be accessed directly by the computing device 340. Accordingly, in one embodiment, the computing device 340 may access the program by contacting the server 320. In one embodiment, the server 320 may be the same as the publisher 310. Alternatively, the computing device 340 may access the program by coupling to a desktop or laptop computer 330 which further couples to the server 320.

It is appreciated that the program may be supplied to the computing device 340 using different methods. For example, the program for a given printed material may be previously stored in the computing device 340 or stored in a removable memory storage and then supplied to the computing device 340. Alternatively, the program may be accessed by the computing device 340 or downloaded to the computing device 340. As such, the method which the program is supplied to the computing device should not be construed as limiting the scope of the present invention.

Figure 4A:
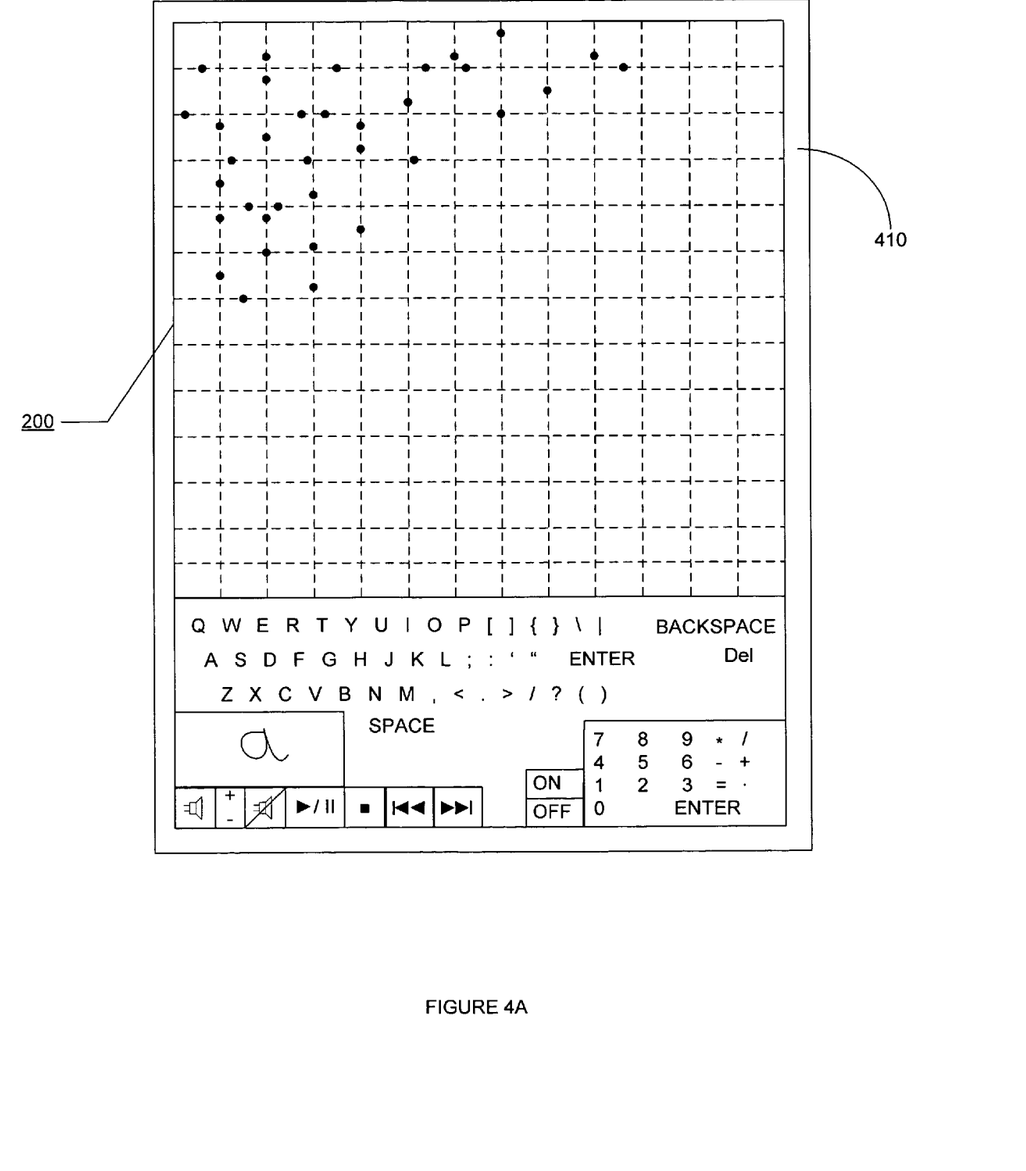
FIGS. 4A, 4B and 4C show a dot template with a frame and a protecting covering for protecting the dot template from being damaged in accordance with one embodiment of the present invention.

Referring now to FIG. 4A, a dot template 200 with a protecting frame 410 in accordance with one embodiment of the present invention is shown. In this embodiment, the dot template 200 is placed inside a frame 410. The frame 410 is used to protect the dot template 200 from bending or scratching or from damage due to wear and tear. In one embodiment, the frame is rigid frame and is operable to be placed over a printed material. The frame 410 may have a smooth and solid surface to protect the surface of the dot template 200 from being punctured when pressed in order to select a printed element, for example.

Moreover, the frame 410 may serve as a registration device aligning a dot template with the printed material. In this way, the frame may align physically with the boundaries of the page of content over which the template is laid. The frame may help to hold and position the template over the printed material.

Figure 4B:
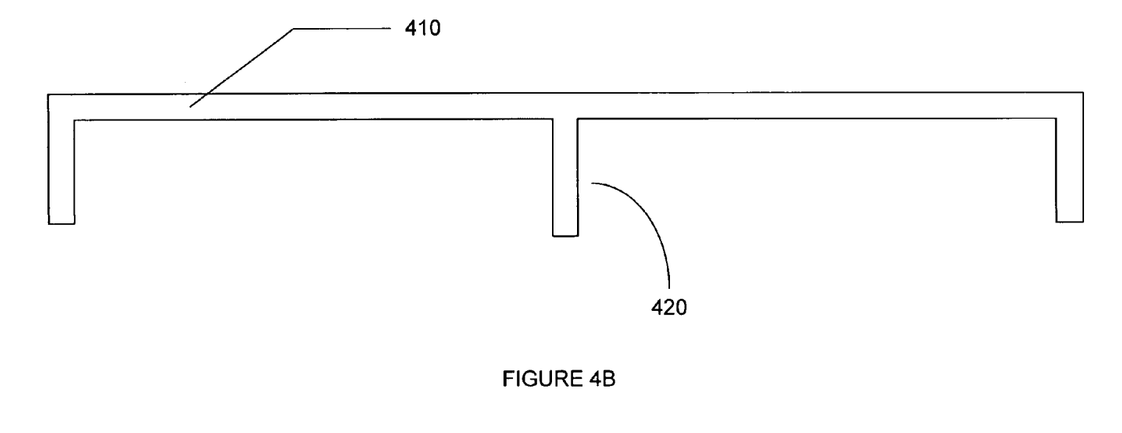

Referring now to FIG. 4B, a side view of the frame in accordance with one embodiment of the present invention is shown. In one embodiment, the frame 410 may have a hook 420 for additional support in the mid section of the frame 410. The hook on the template may be used to hold the page of the printed content to establish and maintain registration to the dot pattern on the template to the page.

Figure 4C:
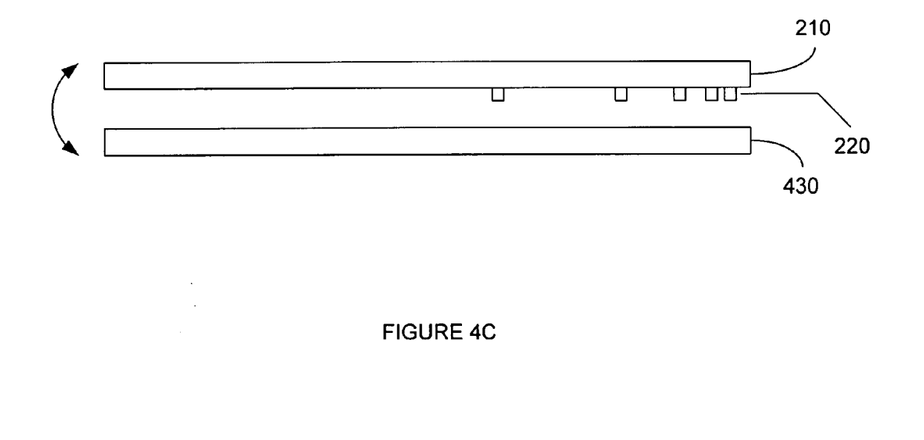

Referring now to FIG. 4C, a side view of a protecting layer 430 for providing protection to a plurality of dot patterns encoded on the dot template in accordance with one embodiment of the present invention is shown. The first portion 210 of the dot template 200 comprises a plurality of dot patterns 220 as described above. A protecting layer 430 is used in order to protect the plurality of dot patterns 220 from being damaged due to wear and tear or from being scratched. In one embodiment, the protecting layer 430 is a clear coating protecting layer. In one embodiment, the protecting 430 layer may be a laminate. Accordingly, the durability of the plurality of dot patterns 220 increases since they are protected from being scratched or damaged.

Figure 5A:
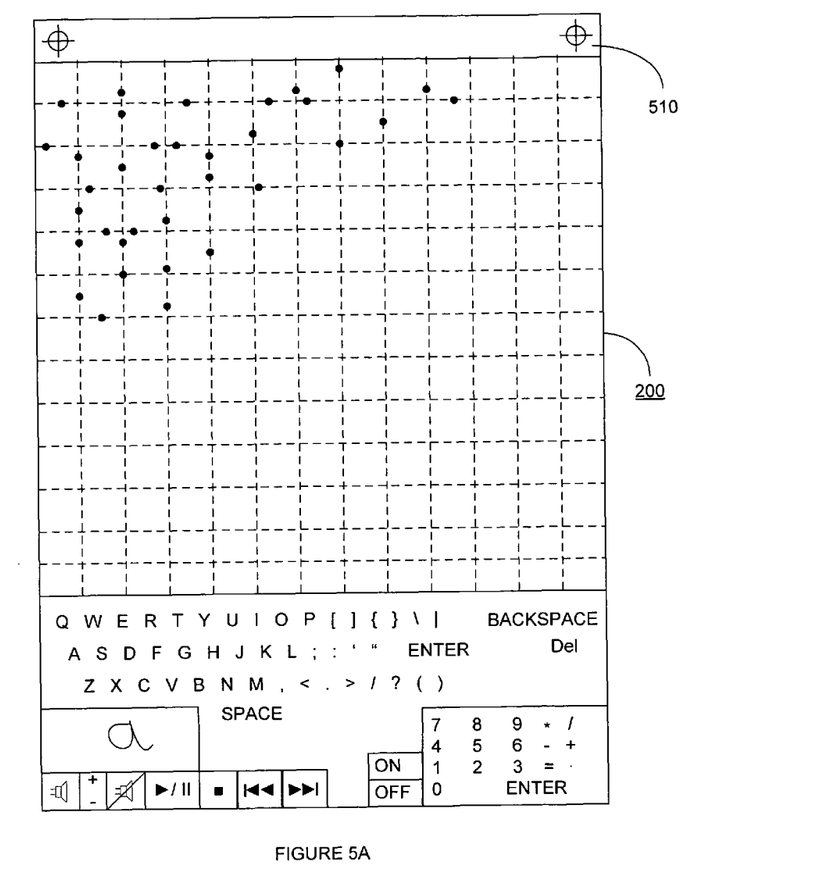
FIGS. 5A and 5B show a dot template with a registration mark used for alignment in accordance with one embodiment of the present invention.

Referring now to FIG. 5A, a dot template with a registration mark in accordance with one embodiment of the present invention is shown. In one embodiment, the dot template 200 comprises at least one registration mark 510. The registration mark may include fiducial and other targets that may be used for alignment. The registration mark 510 may be used to align the dot template with a registration indicator of the printed material. Aligning the dot template 200 with the printed material is important because if the template and the printed material are not properly aligned, the computing device 100 may detect the wrong printed element and as a result outputs the wrong information. It is appreciated that in one embodiment, the material that the dot template 200 is made of, builds up static electricity. Accordingly, the buildup of static electricity may provide as a mechanism to adhere the dot template 200 to a printed material (e.g., paper) and further serves as an alignment mechanism.

Figure 5B:
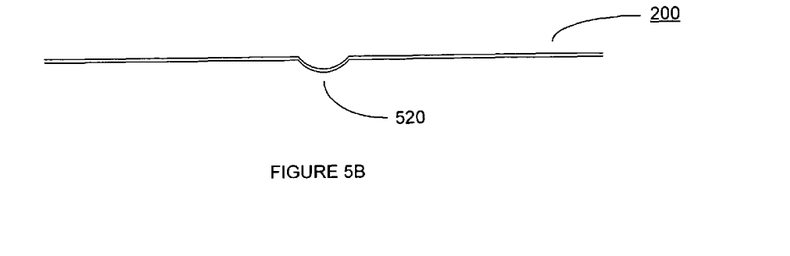

Referring now to FIG. 5B, a side view of a dot template 200 with a heat formed registration mark in accordance with one embodiment of the present invention is shown. In one embodiment, the dot template 200 may be heated at one spot and pressed in a tool (e.g., a press) to form a bump 520 or lip. The bump 520 may serve as a registration mark to align the dot template 200 by sliding into place when placed on a printed material. For instance, the bumps may be positioned to align with page edges to hold the printed content.

Figure 6A:
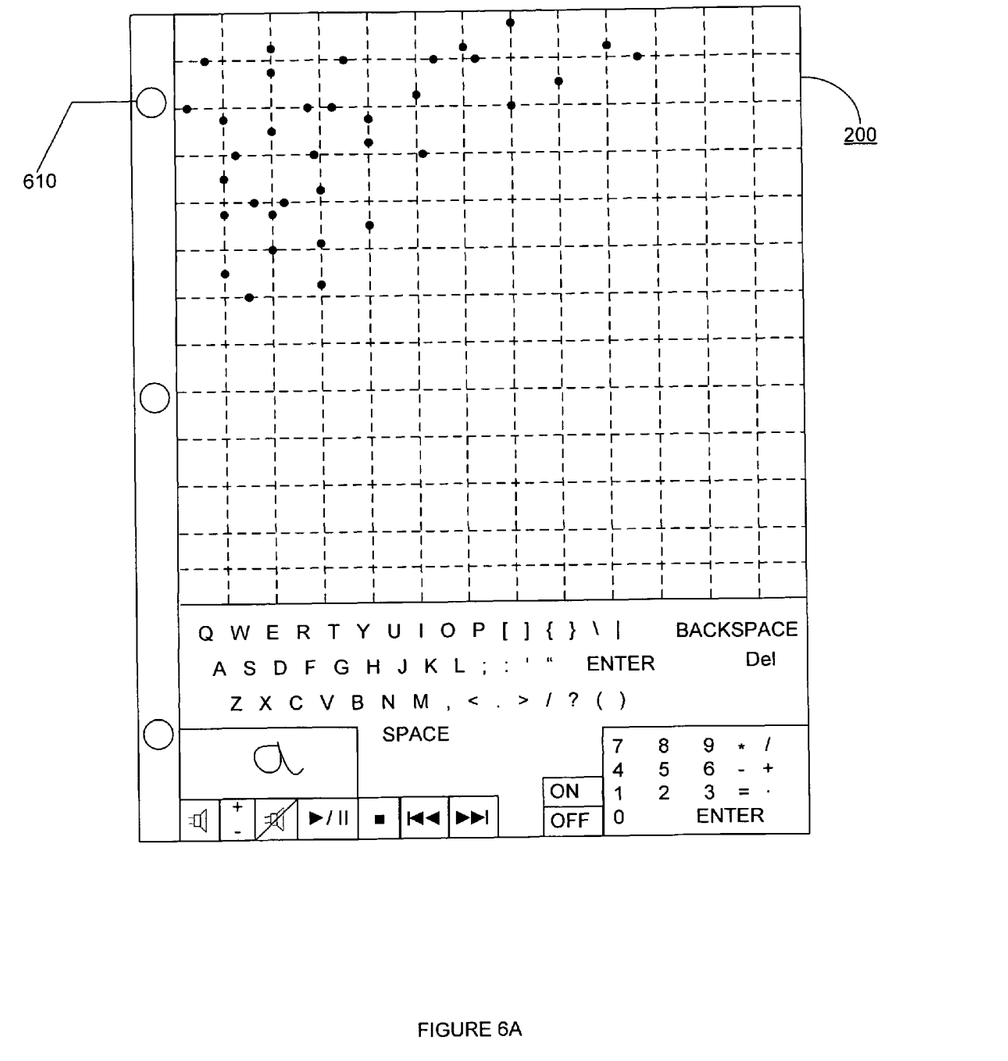
FIGS. 6A and 6B show a dot template operable for binding to a printed material in accordance with one embodiment of the present invention.

Referring now to FIG. 6A, a dot template 200 operable to be bound e.g., within a binder, in accordance with one embodiment of the present invention is shown. In one embodiment, the dot template 200 comprises a plurality of openings 610 operable to be placed in a binder. Accordingly, the dot template 200 is removable and can be carried in a binder.

Figure 6B:
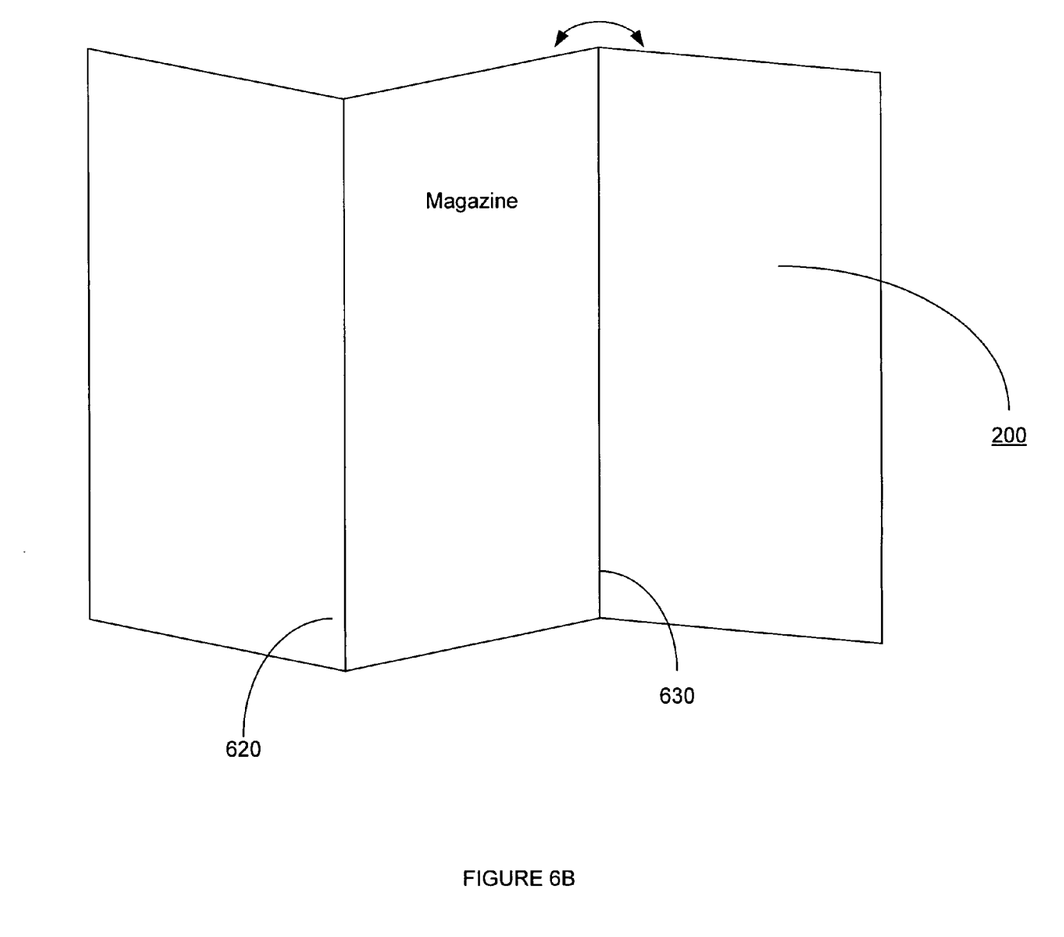

Referring now to FIG. 6B, a dot template 200 bounded to a bind back printed material in accordance with one embodiment of the present invention is shown. In one embodiment, the printed material 620 is a bind back magazine. The dot template 200 is attached and bound to the magazine along a bend line 630. Accordingly, for each page of the magazine, the dot template 200 may be flipped and placed over the printed material of a given page. As such, the dot template 200 provides user interaction for magazine by utilizing the template and the computing device 100 as described above.

Figure 7:
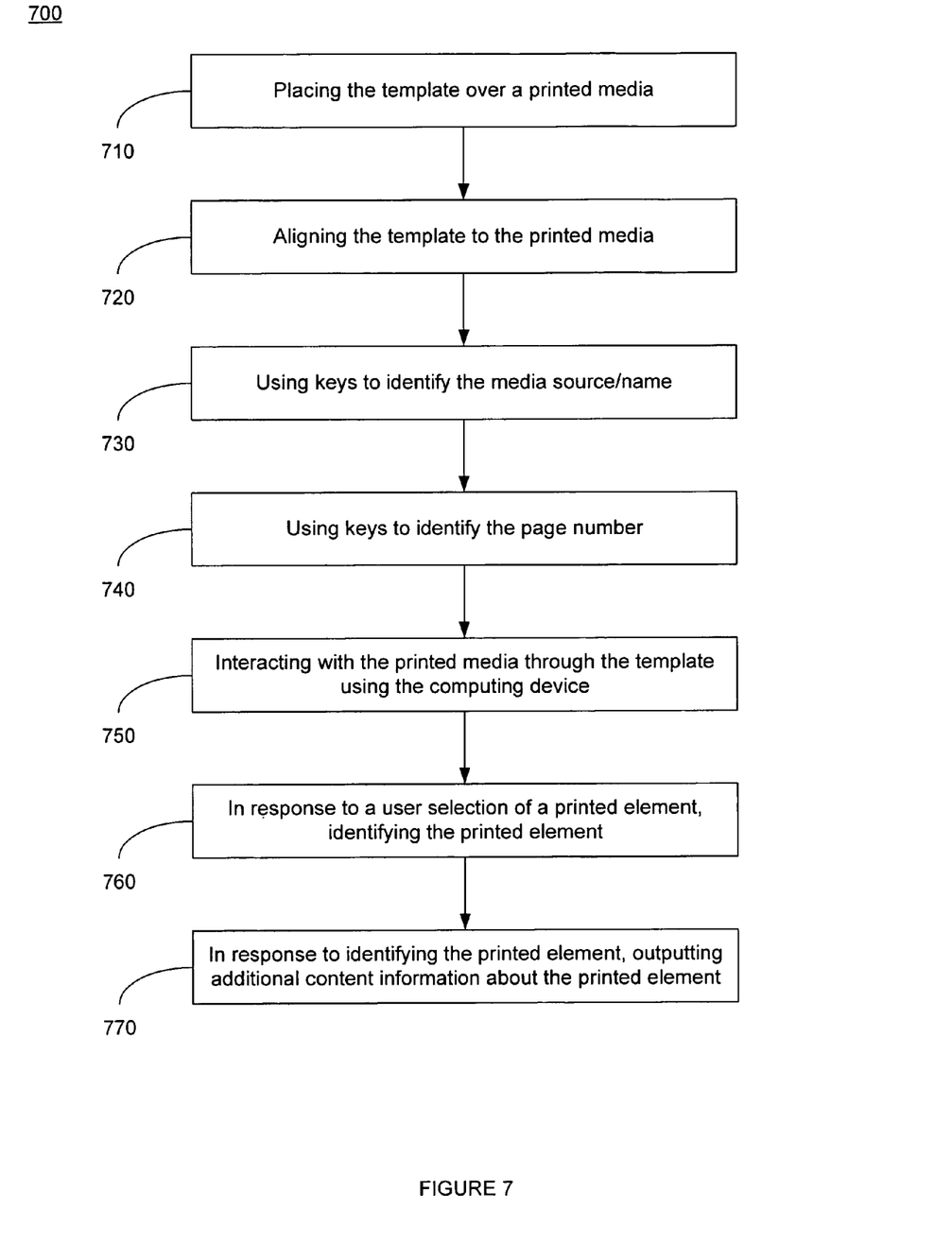
FIG. 7 shows a flow chart illustrating an exemplary method of use of the dot template in accordance with one embodiment of the present invention.

Referring now to FIG. 7, a flow chart 700 illustrating an exemplary method of use of the dot template in accordance with one embodiment of the present invention is shown. At step 710, the template as described above is placed over a page of a printed media (e.g., page 11 of a book). At step 720, the template is aligned with the printed media. At step 730, using the input mechanism of the template (e.g., a keyboard, handwriting recognition) as described above, the user may enter information about the printed media (e.g., a Time magazine). As a result, the computing device may identify the printed media as described above. Moreover, at step 740 the user may enter information about a specific portion of the printed media (e.g., page number).

At step 750, upon identifying the page number, the user may start interacting with the printed media through the template and by using the computing device. Accordingly, the user may select a printed element/image. For example, the user may select the image of George Washington. At step 760, in response to the selection, the computing device identifies the printed element as described above. Furthermore, at step 770, the computing device may output content information regarding the selected printed element, as described above.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A template comprising:
a first portion comprising a plurality of position indicating dot patterns, wherein said first portion is substantially transparent and operable to be placed over a printed material comprising a plurality of printed elements, and further operable to enable selection recognition of a printed element, wherein in response to said selection a computing device is operable to identify said printed element based on a selected plurality of dot patterns corresponding to said selected printed element; and
a second portion comprising a plurality of selectable items corresponding to a plurality of dot patterns operable to enable a user to control the interaction between said computing device and said printed material, wherein said second portion enables a user to enter information about said printed material to identify said printed material such that in response to a user selection of a printed element, information about said selected printed element can be provided.

2. The template as described in claim 1 further comprising:
at least one registration mark operable to align said template with said printed material.

3. The template as described in claim 1, wherein said first portion further comprises a protection layer operable to protect said plurality of dot patterns from damage, and wherein said protection layer covers the exposed surface of said plurality of dot patterns.

4. The template as described in claim 3, wherein said protection layer is a clear coating layer.

5. The template as described in claim 3, wherein said protection is a laminate.

6. The template as described in claim 1 further comprising:
a frame for housing said first and second portions wherein said frame is operable to protect said first and second portions from damage, and wherein said frame is further operable to align said template with said printed material.

7. The template as described in claim 1, wherein said second portion comprises a plurality of icons operable for controlling the operation of said computing device, wherein said operation comprises controlling the volume of said computing device.

8. The template as described in claim 1, wherein a material used to create said first and second portions is selected from a group consisting of polyvinyl chloride, polyethylene terephthalate, mylar or acetate.

9. A system comprising:
a pattern printed template comprising:
a first portion comprising a plurality of dot patterns, wherein said first portion is substantially transparent and operable to be placed over a printed material comprising a plurality of printed elements; and
a second portion comprising a plurality of selectable images operable to enable a user to control the interaction between a computing device and said printed material, wherein said computing device in response to a user to entering information about said printed material identifies said printed material such that in response to a selection of a printed image, information about said selected printed image can be provided; and
said computing device operable to enable selection of a printed image, and in response thereto to identify said selected printed image and provide information about said selected printed image based on selected plurality of dot patterns corresponding to said selected printed image.

10. The system as described in claim 9, wherein said template further comprises at least one registration mark operable to align said template with said printed material.

11. The system as described in claim 9, wherein said first portion further comprises a protection layer operable to protect said plurality of dot patterns from damage, and wherein said protection layer covers the exposed surface of said plurality of dot patterns.

12. The system as described in claim 11, wherein said protection layer is a clear coating laminate.

13. The system as described in claim 9, wherein said template further comprises:
a frame for housing said portions wherein said frame is operable to protect said portions from being damaged, and wherein said frame is further operable to align said template with said printed material.

14. The system as described in claim 9, wherein said selectable images of said second portion comprises at least one of a plurality of icons operable for entering information, a plurality of icons for controlling volume of said computing device, and an icon for activating and deactivating interaction between said computing device and said template.

15. The system as described in claim 9, wherein a material used to create said template is selected from a group consisting of polyvinyl chloride, polyethylene terephthalate, mylar or acetate.

16. A method of interaction with a printed material comprising:
identifying a printed material that a transparent dot template is placed over and in response thereto accessing a plurality of executable codes for said printed material, wherein said dot template comprises:
a first portion comprising a plurality of dot patterns, wherein said first portion is substantially transparent and operable to be placed over said printed material comprising a plurality of printed elements; and
a second portion comprising a plurality of selectable items operable to enable a user to control the interaction between a computing device and said printed material;
in response to a user selection of a printed element, determining said selected printed element based on a selected plurality of dot patterns corresponding to said selected printed element;
in response to said determining said user selected printed element, determining information about said selected printed element; and
in response to said determining information about said selected printed element, outputting said determined information.

17. The method as described in claim 16, wherein said identifying said printed material comprises responding to user input using said second portion to enter information to identify said printed material.

18. The method as described in claim 16 further comprising:
in response to said identifying said printed material, downloading a plurality of executable codes for said printed material.

19. The method as described in claim 16, wherein said outputting comprises at least one of audio and visual format.

* * * * *